United States Patent [19]

Verbrugge et al.

[11] 3,917,667

[45] Nov. 4, 1975

[54] PROCESS FOR PREPARING GEM-DIHALOCYCLOPROPANECARBOXYLIC ACID DERIVATIVES

[75] Inventors: Pieter A. Verbrugge; Elisabeth W. Uurbanus, both of Amsterdam, Netherlands

[73] Assignee: Shell Oil Company, Houston, Tex.

[22] Filed: May 14, 1973

[21] Appl. No.: 359,931

[30] Foreign Application Priority Data

May 16, 1972 United Kingdom............... 22911/72

[52] U.S. Cl......................... 260/468 H; 260/557 R
[51] Int. Cl.$^2$................ C07C 69/74; C07C 103/19
[58] Field of Search.................... 260/468 H, 557 R

[56] References Cited

FOREIGN PATENTS OR APPLICATIONS 1,227,144   4/1971   United Kingdom

*Primary Examiner*—Anton H. Sutto
*Assistant Examiner*—Michael Shippen

[57] ABSTRACT

Esters and amides of gem-dihalocyclopropanecarboxylic acids (which can be converted to the acids per se by pyrolysis or acid hydrolysis, respectively) are prepared by reacting an ester or an amide of an alkenecarboxylic acid with a dihalocarbene in an aqueous phase containing an alkali metal hydroxide and in the presence of certain onium catalysts hereinafter described.

10 Claims, No Drawings

PROCESS FOR PREPARING GEM-DIHALOCYCLOPROPANECARBOXYLIC ACID DERIVATIVES

BACKGROUND OF THE INVENTION

A variety of salts, esters and derivatives of gem-dihalocyclopropanecarboxylic acids, as well as the acids themselves, are of interest as insecticides and fungicides. These compounds can be described (German Pat. No. 2,219,710) by the formula:

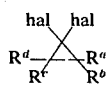

wherein each "hal" is halogen (preferably Cl or Br), $R^b$ and $R^c$ each is hydrogen or alkyl, $R^d$ is hydrogen, alkyl or phenyl, and $R^a$ is cyano, carboxyl, thiocarboxyl, or a salt, ester, amide or mono-N-substituted amide thereof.

It is therefor desirable that there be available a practical process for the preparation of gem-dihalocyclopropanecarboxylic acids.

It is known that gem-dihalocyclopropanes and derivatives thereof can be prepared by reacting an olefin with a dihalocarbene,

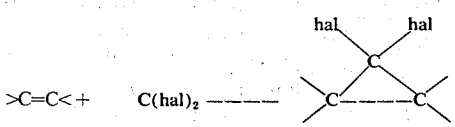

The leading reference on this reaction appears to be Makosza et al, Tetrahedron Letters, volume 53, pages 4659–4662 (1969). The reaction is conducted by contacting aqueous base, such as sodium hydroxide, with a haloform, such as chloroform (to generate the dihalocarbene), containing an olefin and, as catalyst, triethylbenzylammonium chloride.

However, it has now been found that this generalized procedure cannot be used effectively to convert alkenecarboxylic acids to the corresponding gem-dihalocyclopropanecarboxylic acids, since the base used to generate the dihalocarbene attacks the alpha-hydrogen atom or alkyl moiety (bonded to the carbon atom bearing the carboxyl moiety) to give other products than that desired.

SUMMARY OF THE INVENTION

It now has been found that gem-dihalocyclopropanecarboxylic acids can be prepared by reaction of a dihalocarbene with (a) a tertiary-alkyl ester of an alpha-unsubstituted alkenecarboxylic acid, (b) an N-substituted amide of an alpha-unsubstituted alkenecarboxylic acid, (c) an alkyl ester of an alpha-(alkylsubstituted)alkenecarboxylic acid, or (d) an N-substituted amide of an alpha-(alkyl-substituted)alkenecarboxylic acid, to form the corresponding ester or amide of a gem-dihalocyclopropanecarboxylic acid. The free acid can then be obtained by pyrolysis of the ester or acid hydrolysis of the amide, if desired; however, in some cases a desired cyclopropane ester or amide can be prepared directly from the appropriate alkenecarboxylic acid ester or amide.

Accordingly, this invention is a process for preparing esters and amides of gem-dihalocyclopropanecarboxylic acids which comprises contacting an aqueous phase containing an alkali metal hydroxide and an organic phase containing both a haloform and an alkenecarboxylic acid derivative which is one of:

(a) tertiary-alkyl esters of alpha-unsubstituted alkenecarboxylic acids;

(b) alkyl esters of alpha-(alkyl-substituted) alkenecarboxylic acids; and (c) N-substituted amides of alkenecarboxylic acids; in the presence of, as catalyst, at least one of certain onium compounds as hereinafter described.

Application of the process of this invention for the preparation of a particular pesticidally active compound is demonstrated and exemplified by the preparation of 2,2-dichloro-3,3-dimethylcyclopropanecarboxylic acid. First, beta-methylcrotononitrile is prepared, for example, by reacting methallyl chloride and sodium cyanide or by reacting isobutyraldehyde and hydrogen cyanide followed by dehydration of the 2-hydroxy-3-methylbutanenitrile formed. Then, beta-methylcrotononitrile is converted into N-tert-butyl-beta-methylcrotonamide according to the reaction of J. J. Ritter (Chapter 3, "Organic Reactions," Volume 17, 1969, John Wiley & Sons, Inc., New York) by reaction with isobutene in the presence of concentrated sulfuric acid followed by dilution with water. Addition of dichlorocarbene (dichloromethylene) to the latter amide according to the process of this invention yields N-(tert-butyl)-2,2-dichloro-3,3-dimethylcyclopropanecarboxamide, which is easily converted into the corresponding carboxylic acid (and the corresponding acid salt of an amine) by heating in a mineral acid, such as concentrated hydrochloric acid. The carboxylic acid crystallizes upon cooling and may be isolated by filtration. If desired, the amine simultaneously formed may be recovered from the filtrate.

The pesticidal acid can also be prepared by reacting dichloromethylene with the tert-butyl ester of beta-methylcrotonic acid to form the tert-butyl ester of 2,2-dichloro-3,3-dimethylcyclopropanecarboxylic acid. The acid per se is readily obtained by heating the ester at a temperature in the range of about 200°C to about 250°C. (For example, this ester is completely converted to the acid when heated for 10 minutes at 210°C.) The by-product of the pyrolysis is the appropriate alkene — in the case of the tert-butyl ester, the alkene is isobutene. (Which, of course, could be recycled to prepare more of the N-tert-butyl-beta-methylcrotonamide precursor.)

DESCRIPTION OF THE PREFERRED EMBODIMENTS

While the process of the invention appears to be applicable to conversion of any alkenecarboxylic acid

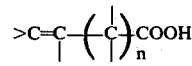

wherein $n = 0$ or a whole member, and the free valence bonds may be satisfied by hydrogen or any substituent not reactive with strong base and/or dihalocarbene, the process of this invention is of particular interest (because of biological activity of the gem-dihalocyclopropanecarboxylic acid or derivative prepared therefrom) for conversion of acrylic acids of the general formula:

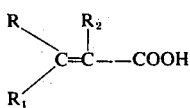

wherein R is hydrogen alkyl or phenyl and $R_1$ and $R_2$ each independently is hydrogen or alkyl.

According to this invention an ester or amide of the alkenecarboxylic acid is employed. If the acid is alpha-unsubstituted — $R_2$ is hydrogen — then a tertiary-alkyl ester is employed. If the acid is alpha-substituted — $R_2$ is alkyl — then any alkyl ester is suitable. For either type of acid, an N-substituted amide can be employed.

Preparation of the necessary ester can be accomplished by known esterification procedures. Examples of suitable esters are esters of tert-butyl alcohol; 2-methyl-2-butanol; 3-methyl-3-pentanol; 1-alkylcycloalkanols; such as 1-methylcyclopentanol and 1-methylcyclohexanol. Suitably the ester group contains up to 20 carbon atoms, preferably up to 10 carbon atoms. Particularly suitable are the tertiary-butyl esters.

In the amides, suitable substituents on the nitrogen atom are, for example, lower alkyl, cycloalkyl, aryl, aralkyl and alkaryl groups. The nitrogen atom may form part of a hetero-aromatic system, and, if desired, inert substituents may also be present. There may be one or two substituents on the nitrogen atom. The alkyl groups may be primary, secondary or tertiary. Tertiary hydrocarbyl groups, particularly tertiary alkyl groups are very suitable as substituent. Excellent results have been obtained with N-tert-butyl-substituted carboxamides. Other examples of suitable tertiary alkyl groups are 2-methyl-2-butyl and 3-methyl-3-pentyl groups and those derived from alkylcycloalkanes, for instance from methylcyclohexane. For example, N-tert-butyl beta-methylcrotonamide is converted with a very good yield into N-tert-butyl-2,2-dichloro-3,3-dimethylcyclopropane amide. An example of an N-cycloalkyl substituted carboxamide is N-1-adamantyl-beta-methylcrotonamide, which is converted with a very good yield into N-1-admantyl-2,2-dichloro-3,3-dimethylcyclopropanecarboxamide. Suitably each substituent on the nitrogen atom contains up to 20 carbon atoms, preferably up to 10 carbon atoms.

Such amides are readily prepared by methods known in the art. Typical methods for preparing such amides are described hereinbefore for the preparation of N-tert-butyl-beta-methylcrotonamide.

Conversion of the ester or amide may be effected by simply mixing: (a) the ester or amide, (b) a haloform, (c) an aqueous alkali metal hydroxide and (d) the catalyst, the mixing being conducted for a sufficient time to permit the reaction to go to completion.

The haloform which is used has the general formula

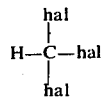

in which each hal represents a halogen atom, viz. a fluorine, chlorine, bromine or iodine atom. The halogen atoms present in the haloform may be the same or different; they may be present in all possible combinations. Examples of haloforms are $CHF_3$, $CHF_2Cl$, $CHFCl_2$, $CHCl_3$, $CHIBr_2$ and $CHClBrI$. Very good results have been obtained with $CHCl_3$.

The aqueous alkali metal hydroxide is preferably a strong aqueous solution with a concentration of preferably at least 30% by weight and in particular of at least 40% by weight alkali metal hydroxide. The maximum concentration of the alkali metal hydroxide in the solution is the concentration of a saturated solution at the temperature at which the process is effected. Solid alkali metal hydroxide may be present. The alkali metal hydroxides which are used, are those of lithium, sodium, potassium, rubidium and cesium. Very good results have been obtained with aqueous sodium hydroxide having a concentration of at least 45% by weight.

The suitable catalysts can be described as quaternary onium compounds having one of the formulae:

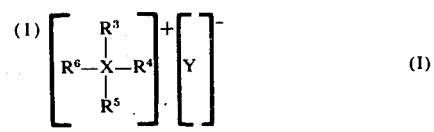

in which X is nitrogen, phosphorus, arsenic or antimony, Y is a hydroxide or other anion, and $R^3$, $R^4$, $R^5$ and $R^6$ each is hydrocarbyl of up to 40 carbon atoms each, with the provisos that (a) $R^3$, $R^4$, $R^5$ and $R^6$ are not all simultaneously aromatic, and (b) if Y is other than iodide at least two of $R^3$, $R^4$, $R^5$ and $R^6$ are not aromatic;

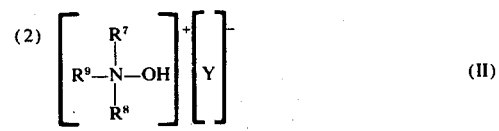

in which $R^7$, $R^8$ and $R^9$ each is alkyl or cycloalkyl of up to 40 carbon atoms each and Y is hydroxide, or other anion; and/or tri(cyclo)alkyl onium compounds of the formula

in which $R^{10}$, $R^{11}$ and $R^{12}$ each is alkyl or cycloalkyl of up to 40 carbon atom each, Z is sulfur, selenium or tellurium with the proviso that when Z is sulfur then $R^{10}$, $R^{11}$ and $R^{12}$ each is alkyl or cycloalkyl and when Z is selenium or tellurium then $R^{10}$, $R^{11}$ and $R^{12}$ each is alkyl; and Y is hydroxide, or other anion.

Surprisingly, it has been found that the phosphorus-, arsenic- and antimony-containing catalysts employed in the process according to the present invention are generally more active than the corresponding nitrogen-containing catalysts: the yield of gem-dihalocyclopropanecarboxylic acid ester or amide after the same reaction time is usually higher and may even approach or be equal to 100%. However, quaternary ammonium salts and hydroxides are effective catalysts, particularly suitable compounds of this class being tetra-alkyl- and trialkylbenzyl-ammonium compounds, especially the halides: n-dodecyltrimethylammonium chloride; tri-n-butyl-methylammonium iodide and trimethylbenzylammonium chloride are very active catalysts.

High yields of gem-dihalocyclopropanecarboxylic acid ester or amide are also often obtained when the quaternary onium compounds of formula II and the tri(cyclo)alkyl onium compounds of formula III are employed as catalysts.

Examples of quaternary onium salts and tri(cyclo)alkyl onium salts which may be used are iodides, bromides, chlorides, fluorides, alkyl sulfates, tetrafluoroborates and tosylates.

In the process of this invention, the catalytic activity of a quaternary onium compound depends on the specific hydrocarbyl groups $R^3$, $R^4$, $R^5$ and $R^6$ and acid rest, Y, employed. The hydrocarbyl groups $R^3$, $R^4$, $R^5$ and $R^6$ may, for example, be alkyl, cycloalkyl, aryl, aralkyl or alkaryl groups. Quaternary onium compounds having aromatic groups (for example tetraphenylphosphonium iodide) and quaternary onium salts not being iodides and having three aromatic groups (for example triphenylmethylphosphonium chloride and triphenyl-n-butylphosphonium bromide) do not, or hardly, catalyze the generation of dihalomethylenes. In contradistinction thereto, quaternary onium iodides having three aromatic groups $R^3$, $R^4$ and $R^5$ and one alkyl group $R^6$ (for example triphenylmethylarsonium iodide) are very active catalysts. Where Y is other than iodine, of the groups $R^3$, $R^4$, $R^5$ and $R^6$, none, one or two may represent an aromatic group. Preferred quaternary onium compounds are those wherein $R^3$, $R^4$, $R^5$ and $R^6$ all are alkyl, straight-chain or branched, and for example, with up to 20 carbon atoms each; methyl and ethyl are preferred. Among the quaternary onium compounds of formula I the phosphonium compounds usually exhibit the highest activity and therefore are preferred. Relatively high yields have been obtained with tetramethylphosphonium and tetraethylphosphonium compounds, particularly the iodides. Subject to the above-mentioned provisos $R^3$, $R^4$, $R^5$ and $R^6$ may be the same, three may be the same and the fourth different, two may be the same and the other two the same or different but differing from the first two, and all may differ from each other.

Very good results are also obtained when the quaternary onium compound of formula I is a hydroxide and is used as a functional portion of a strongly basic anion exchange resin. The strongly basic anion exchange resins used have a structural portion (polymer matrix) and a functional portion (ion-active group). Of special importance are polystyrene resins, such as copolymers of aromatic monovinyl compounds and aromatic polyvinyl compounds, particularly styrene/divinylbenzene copolymers. The functional portion is a quaternary ammonium, phosphonium, arsonium or stibonium group. Examples of strongly basic anion exchange resins which may be employed are those derived from trimethylamine (such as the products known under the trade names of "Amberlite IRA-400", "Amberlite IRA-401", "Amberlite IRA-402", "Amberlite IRA-900", "Duolite A-101-D", "Duolite ES-111", "Dowex 1", "Dowex 11", "Dowex 21K" and "Ionac A-450") (all ten trade names are registered trade marks) and those derived from dimethylethanolamine (such as the products known under the trade names of "Amberlite IRA-410", "Amberlite IRA-911", "Dowex 2", "Duolite A-102-D", "Ionac A-542" and "Ionac A-550") (all six trade names are registered trade marks). Very good results have been obtained with those derived from trimethylamine.

When these catalysts are available in a neutralized form, for instance in the chloride form, they must be activated to the hydroxyl form by treatment with an aqueous alkali metal hydroxide, for example sodium hydroxide, and washed with water to remove salt anions before use.

Of the tri(cyclo)alkyl onium compounds of formula III — those of sulfur, selenium and tellurium — those of sulfur exhibit a particularly high activity. $R^{10}$, $R^{11}$ and $R^{12}$ in formula III and $R^7$, $R^8$ and $R^9$ in formula II may be straight-chain or branched-chain alkyl, or cycloalkyl of up to, for example, 40 carbon atoms each, preferably of up to 20 carbon atoms each. Trimethyl onium compounds of formula III exhibit a relatively low activity. In contradistinction, (cyclo)alkyl onium compounds of fomrula III having more than three carbon atoms per molecule exhibit a very high activity. The three alkyl groups may be the same, two may be the same and the third different or the three groups may all be different. Examples of very active catalysts are triethylsulfonium iodide, di-sec-decyl-methylsulfonium chloride, n-hexadecyldimethylsulfonium methyl sulfate, sec-dodecylsec-hexadecylethylsulfonium ethyl sulfate, sec-hexadecyldimethylsulfonium iodide, sec-hexadecylmethylethylsulfonium tosylate, sec-hexadecyldimethylsulfonium tosylate, trimethylsulfonium bromide, di-n-butylmethylsulfonium iodide, iodide, trimethylhydroxylammonium hydroxide, methyldiethylhydroxylammonium iodide, methyldiethylhydroxylammonium iodide and triethylhydroxylammonium hydroxide. The trialkylsulfonium compounds may easily be prepared by converting an alpha-alkene with hydrogen sulfide into a sec-mercaptan, reacting this sec-mercaptan with another alpha-alkene molecule to form a di-sec-alkyl sulfide and reacting this sulfide with an alkylating agent, for example diethyl sulfate.

The catalysts used in the process according to the present invention may be added to the aqueous and/or organic phase or may be formed in situ. Examples included later herein illustrate in situ preparation. Quaternary onium compounds of formula I can be prepared in situ by alkylating tertiary amines, phosphines, arsines or stibines, for example, with trialkyloxonium tetrafluoroborate. Quaternary onium compounds of formula II can be prepared in situ starting from a (cyclo)aliphatic tertiary amine and hydrogen peroxide, from a di(cyclo)alkylhydroxyl amine and an alkyl iodide or by hydration of a (cyclo)aliphatic tertiary amine oxide. Onium compounds of formula III can be prepared in situ starting from a di(cyclo)alkyl sulfide (selenide, telluride) and a (cyclo)alkyl halide. It has been found that some organic sulfur compounds not falling within the scope of formula III nevertheless exhibit some catalytic activity. It is believed that these compounds are at least partly converted in situ into compounds falling within the scope of formula III. The following examples illustrate this finding. Trialkylsulfoxonium iodides are reduced to trialkylsulfonium iodides, di-n-butylsulfide is alkylated with chloroform to di-n-butyl-dichloromethylsulfonium chloride, dimethyl sulfone is reduced to dimethyl sulfide which is alkylated by chloroform to dimethyldichloromethylsulfonium chloride, and chloroform alkylates phenyl-di-(phenylsulfinylmethyl)-phosphine oxide to the corresponding mono- and disulfonium chlorides. A similar phenomenon has been found for in situ preparation of compounds falling within the scope of formula I. For example, tributylphosphine oxide and tributylphosphine are alkylated with chloroform in situ into tributyldichloromethylphosphonium chloride, phenyldihydroxymethylphosphine oxide is alkylated with chloroform into phenyldihydroxymethyldichloromethylphosphonium chloride and the di-ester of phenyldihydroxymethylphosphine sulfide and p-toluenesulfonic acid is converted in situ with chloroform into the diester of phenyldihydroxymethyldichloromethylphosphonium chloride.

A physical mixture of any one of the above-mentioned onium compounds may be used as the catalyst. It is possible to use a compound having two or more of the onium structures mentioned in formulas I, II and III in one molecule.

$R^3$, $R^4$, $R^5$, $R^6$, $R^7$, $R^8$, $R^9$, $R^{10}$, $R^{11}$ and $R^{12}$ may represent substituted hydrocarbyl groups. A hydroxyl group is an example of a substituent: tetrakis(hydroxymethyl)phosphonium chloride catalyses in situ generation of dihalomethylenes.

As has already been pointed out, the conversion of the ester or amide can be effected by simply mixing the reactants and catalyst for a period of time sufficient to premit the conversion to be complete. The mixing should be vigorous, because this improves the yield of, and the selectivity of conversion of the ester or amide to, the desired gem-dihalocyclopropanecarboxylic acid ester or amide. In most cases, conversion will be complete in about one to five hours time.

Suitably the conversion may be conducted at temperatures within the range of from about 0°C to about 200°C. Ordinarily it will be found to be desirable that the conversion be carried out at a temperature of at least 20°C, but below about 100°C, with mildly elevated temperatures — say from 30°–60°C — being about optimum from the practical conduct of the conversion.

The process is conveniently carried out at atmospheric pressure.

The molar ratio in which the haloform and the ester or amide and the molar ratio in which the haloform and the alkali metal hydroxide are employed may vary within a wide range and are not critical. The more haloform and the more alkali metal hydroxide are used, relatively, the more rapid the reaction proceeds. Preferably the ester(amide)/haloform molar ratio lies between 1:1 and 1:20, while the preferred haloform/alkali metal hydroxide molar ratio is between 1:1 and 1:10. Molar ratios outside the preferred two ranges are not excluded.

The catalyst is usually employed in an amount which may be indicated by the expression "catalytic amount." The minimum amount of catalyst is that amount which gives the smallest noticeable catalytic effect. The catalyst/haloform molar ratio is preferably between 1:10 and 1:10,000, but molar ratios 1:<10 and 1:>10,000 are not excluded. Excellent results have been obtained with catalyst/haloform molar ratios between 1:100 and 1:1000.

The process may be effected in the presence or in the absence of a solvent. Suitable solvents are: n-alkanes, for example n-pentane, n-hexane and n-heptane; ethers, for example ethers with straight alkyl groups, in particular diethylether, and cyclic ethers, in particular dioxane. The solvents may be used in an amount ranging within wide limits, for example in a haloform/solvent weight ratio in the range between 0.1:1 and 20:1. Weight ratios outside this range are not excluded. Chlorinated hydrocarbons, in particular dihalomethanes, are particularly useful solvents, because they lead to a considerable increase of the yield of gem-dihalocyclopropane derivatives. With dichloromethane yields of 100% or nearly 100% have been obtained.

Since the gem-dihalocyclopropanecarboxylic acid ester or amide product is essentially insoluble in the aqueous phase of the final reaction mixture, the product can be recovered by phrase separation and recovery from the organic phase by orthodox techniques, such as evaporation of the solvent, followed by re-crystallization from a suitable liquid; by extraction of the organic phase with a selective solvent (such as ether) for the product. If, because of the physical character of the final reaction mixture, phase separation does not appear feasible (the final mixture is an apparently intractable emulsion, or the like), the product may be recovered by extraction of the mixture with a suitable selective solvent such as ether. Alternatively, the cyclopropane derivative may be isolated by dissolving the product mixture in concentrated hydrochloric acid, filtering off non-dissolved material and diluting the filtrate with water, followed by separating the precipitate obtained upon this dilution, being the derivative in a very pure state.

Conduct of the process of the invention in specific cases is shown in the following examples:

EXAMPLE I

Experiment 1 was carried out as follows: A mixture of 3.3 grams of tert-butyl beta-methylcrotonate, 10 grams of chloroform, 10 milliliters of 50%w aqueous sodium hydroxide, 5 milliliters of n-pentane and 0.025 gram of trimethylbenzylammonium chloride was kept at 40°C, with stirring. One milliliter of n-octane was present to serve as a GLC marker. Samples were taken at the indicated times after stirring had been started, as indicated in Table I. The conversions and selectivities stated in Table I were determined with the aid of GLC analysis. The conversion is the percentage tert-butyl beta-methylcrotonate that had been converted at the time indicated. The selectivity is the percentage of the converted tert-butyl beta-methylcrotonate that had been converted into tert-butyl 2,2-dichloro-3,3-dimethylcyclopropanecarboxylate.

Table I presents the conversion and selectivity of experiment 1 and those of experiments 2–7, which were repetitions of experiment 1, the only differences being stated in the table under "conditions."

TABLE I

| Exp. No. | Conditions | Sample taken hours after start | Conversion % | Selectivity % |
|---|---|---|---|---|
| 1 | See above | 1 | 24 | 83 |
|   |           | 2 | 35 | 79 |
|   |           | 3 | 48 | 73 |
| 2 | 20 g. CHCl$_3$ | 0.5 | 23 | 94 |
|   |           | 1 | 47.5 | 90 |
|   |           | 2 | 77 | 61 |
|   |           | 3 | 89 | 11 |

TABLE I-continued

| Exp. No. | Conditions | Sample taken hours after start | Conversion % | Selectivity % |
|---|---|---|---|---|
| 3 | 40 g. CHCl₃ | 0.5 | 28 | 98 |
|   |  | 1 | 64 | 57 |
|   |  | 2 | 82 | 13 |
| 4 | 20 g. CHCl₃; 5 ml. diethylether instead of n-pentane | 0.5 | 13 | 100 |
|   |  | 1 | 29 | 92 |
|   |  | 2 | 39 | 85 |
|   |  | 3 | 53 | 80 |
| 5 | 40 g. CHCl₃; 5 ml. diethylether instead of n-pentane | 0.5 | 25 | 96 |
|   |  | 1 | 48 | 82 |
|   |  | 2 | 77 | 48 |
|   |  | 3 | 89 | 11 |
| 6 | 5 ml. diethylether instead of n-pentane | 0.5 | 10 | 94 |
|   |  | 2 | 25 | 82 |
|   |  | 5 | 45 | 59 |
|   |  | 7 | 58 | 46 |
|   |  | 24 | 97 | 2 |
| 7 | 20 g. CHCl₃; 5 ml. diethylether instead of n-pentane; 0.3 g. trimethylbenzyl-ammonium chloride | 0.5 | 23 | 86 |
|   |  | 1 | 42 | 87 |
|   |  | 2 | 73 | 61 |
|   |  | 3 | 85 | 20 |

EXAMPLE II

Experiment 1 was conducted as follows. A mixture of 3.3 grams of tert-butyl beta-methylcrotonate, 20 grams of chloroform, 10 milliliters of 50%w aqueous sodium hydroxide, 5 milliliters of diethylether and 0.025 grams of tetramethylphosphonium iodide was stirred vigorously at 40°C. One milliliter of n-octane was present to serve as a GLC marker. Samples were taken at the indicated times after the start of the stirring, as indicated in Table II. Table II presents the conversions and selectivities of experiments 1–4. Experiments 2–4 were repetitions of experiment 1, the only difference being that the catalysts stated in the table were tested.

TABLE II

| Exp. No. | Conditions | Sample taken hours after start | Conversion % | Selectivity % |
|---|---|---|---|---|
| 1 | Tetramethylphosphonium iodide | 0.5 | 16 | 100 |
|   |  | 1 | 51 | 88 |
|   |  | 2 | 57 | 75 |
|   |  | 3 | 58 | 72 |
| 2 | Tetramethylammonium iodide | 0.5 | 1.5 | 100 |
|   |  | 1 | 1.8 | 100 |
|   |  | 2 | 4.0 | 100 |
|   |  | 3 | 6.3 | 100 |
| 3 | Tetraethylammonium iodide | 0.5 | 15 | 100 |
|   |  | 1 | 22 | 95 |
|   |  | 2 | 37 | 89 |
|   |  | 3 | 78 | 40 |
| 4 | Tetraethylphosphonium iodide | 0.5 | 48 | 84 |
|   |  | 1 | 51 | 84 |
|   |  | 2 | 52 | 83 |
|   |  | 3 | 54 | 82 |

EXAMPLE III

Experiment 1 was carried out as follows. A mixture of 3.1 grams of N-tert-butyl beta-methylcrotonamide, 23.7 grams of chloroform, 10 milliliters of 50%w aqueous sodium hydroxide, 5 milliliters of dioxane and 0.010 grams of trimethylbenzylammonium chloride was stirred vigorously at 40°C. One milliliter of n-octane was present as a GLC marker. Samples were taken after stirring had been started, at the times indicated in Table III, which presents the conversion and the selectivity to N-tert-butyl 2,2-dichloro-3,3-dimethylcyclopropanecarboxamide of experiment 1 and those of experiments 2–11, which were repetitions of experiment 1 the differences being stated in the table under "conditions."

TABLE III

| Exp. No. | Conditions | Sample taken hours after start | Conversion % | Selectivity % |
|---|---|---|---|---|
| 1 | See above | 0.5 | 23 | 82 |
|   |  | 1 | 53 | 82 |
|   |  | 2 | 90 | 64 |
|   |  | 2.5 | 91 | 61 |
| 2 | 5 ml. diethylether instead of dioxane | 0.5 | 19 | 72 |
|   |  | 1 | 36 | 85 |
|   |  | 2 | 51 | 81 |
|   |  | 3 | 62 | 80 |
| 3 | 5 ml. diethylether instead of dioxane; 0.010 g. tetraethyl- | 0.5 | 11 | 75 |
|   |  | 5 | 75 | 69 |
|   |  | 7 | 90 | 55 |

TABLE III-continued

| Exp. No. | Conditions | Sample taken hours after start | Conversion % | Selectivity % |
|---|---|---|---|---|
| 4 | phosphonium iodide 5 ml. diethylether; 0.010 g. tetraethyl- phosphonium iodide | 0.5<br>5<br>7 | 11<br>74<br>86 | 100<br>92<br>90 |
| 5 | 5 ml. diethylether; 0.010 g. tetramethyl- phosphonium iodide | 0.5<br>3<br>5<br>7<br>9<br>11 | 1<br>32<br>47<br>63<br>91<br>92 | 100<br>100<br>96<br>94<br>92<br>76 |
| 6 | 0.010 g. tetramethyl- phosphonium iodide and pentane instead of dioxane | 0.5<br>1<br>2<br>3 | 28<br>55<br>74<br>76 | 100<br>92<br>97<br>93 |
| 7 | 5 ml. dichloromethane instead of diethyl- ether; 0.010 g. tetramethyl- phosphonium iodide | 0.5<br>1<br>2<br>3 | 12<br>83<br>89<br>91 | 100<br>88<br>89<br>90 |
| 8 | 5 ml. dichloromethane instead of diethylether; 20 ml. 50%w NaOH; 0.010 g. tetramethyl- phosphonium iodide | 0.5<br>1 | 95<br>98 | 90<br>90 |
| 9 | 1 g. amide; 5 ml. dichloromethane instead of diethylether; 0.010 g. tetramethyl- phosphonium iodide | 1 | 100 | 100 |
| 10 | 1 g. amide; 5 ml. dichloromethane instead of diethylether; 0.010 g. sec-dodecyl-sec- hexadecylethylsulfonium ethyl sulfate | 1 | 100 | 100 |
| 11 | 1 g. amide; 5 ml. dichloromethane instead of diethylether; 0.010 g. trimethyl-sec- dodecylammonium chloride | 1 | 100 | 60 |

EXAMPLE IV

In a flask provided with a one-blade paddle mixer, 3.2 grams of tert-butyl beta-methylcrotonate, 20.3 grams of chloroform, 10 milliliters of 50%w aqueous sodium hydroxide, 5 milliliters of diethylether and 1 gram of Amberlite IRA-400 (a registered trade name, see hereinabove) was mixed for 24 hours at a temperature varying between 36 and 40°C. The Amberlite IRA-400 was in the OH-form. The conversion and selectivity to tert-butyl 1,1-dichloro-2,2-dimethylcyclopropanecarboxylate are presented in Table IV in the second and third columns from the left.

The experiment was repeated with the only difference that N-tert-butyl beta-methylcrotonamide was employed as the starting material. The conversion and selectivity are presented in the two right-hand columns of Table IV.

TABLE IV

| Sample taken hours after start | Conversion % | Selectivity (ester), % | Conversion % | Selectivity (amide), % |
|---|---|---|---|---|
| 1 | 23 | 100 | 2 | 100 |
| 2 | 33 | 100 | 7 | 100 |
| 3 | 42 | 90 | 11 | 100 |
| 5 | 53 | 87 | 27 | 95 |
| 7 | 66 | 85 | 48 | 96 |
| 24 | 78 | 76 | 72 | 92 |

EXAMPLE V

In a flask provided with a one-blade with a one-blade paddle mixer, a mixture of 1 gram of tert-butyl beta-methylcrotonate, 24 grams of chloroform, 10 milliliters of 50%w aqueous sodium hydroxide, 5 milliliters of dichloromethane and 0.010 gram of sec-dodecyl-sec-hexadecylethylsulfonium ethyl sulfate was stirred vigorously at a temperature of 40°C. One milliliter of n-octane was present to serve as a GLC marker. Samples were taken after the start of the stirring at the times indicated in Table V. Table V presents the conversions and selectivities — as defined in Example I — of experiments 1, 2, 3 and 4. Experiments 2, 3 and 4 were repetitions of experiment 1, the only difference being that 0.020 gram of catalyst was applied in experiment 2 and that two other catalysts were tested in experiments 3 and 4.

TABLE V

| Exp. No. | Catalyst | Quantity of cat grams | Sample taken hours after start | Conversion % | Selectivity % |
|---|---|---|---|---|---|
| 1 | sec-dodecyl-sec-hexadecylethyl- | 0.010 | 3 | 100 | 100 |

TABLE V-continued

| Exp. No. | Catalyst | Quantity of cat grams | Sample taken hours after start | Conversion % | Selectivity % |
|---|---|---|---|---|---|
| | sulfonium ethyl sulfate | | | | |
| 2 | same | 0.020 | 1 | 100 | 100 |
| 3 | tetramethyl-phosphonium iodide | 0.010 | 0.5 | 40 | 100 |
| | | | 1 | 90 | 90 |
| 4 | trimethyl-sec-dode-cyclammonium chloride | 0.010 | 0.5 | 45 | 95 |
| | | | 1 | 65 | 90 |
| | | | 2 | 90 | 40 |

EXAMPLE VI

In a flask provided with a one-blade paddle mixer, a mixture of 6.99 grams of N-1-adamantyl-beta-methylcrotonamide, 35.4 grams of chloroform, 40 milliliters of 50%w aqueous sodium hydroxide and 0.010 gram of tetramethylphosphonium iodide was stirred vigorously at a temperature of 23°C. After 0.25 hour stirring the temperature raised to 32°C and remained for 5.5 hours at this value. Then, the reaction mixture was extracted with diethyl ether, the ether was evaporated from the extract phase and the residue formed was recrystallized from n-pentane. The recrystallized product, N-1-adamantyl-2,2-dichloro-3,3-dimethylcyclopropanecarboxamide, had a melting point of 178°C, was obtained in a yield of 80%.

EXAMPLE VII

In a flask provided with a one-blade paddle mixer, a mixture of 1 gram of N-methyl-beta-methylcrotonamide, 24 grams of chloroform, 5 milliliters of dichloromethane, 1 milliliter of n-octane, 10 milliliters of 50%w aqueous sodium hydroxide and 0.010 gram of catalyst was stirred vigorously at a temperature of 40°C. Four catalysts were tested. Table VI presents the conversion and selectivity to N-methyl-2,2-dichloro-3,3-dimethyl-cyclopropanecarboxamide, measured at four different times after the start of the experiment.

TABLE VI

| Catalyst | Sample taken hours after start | Conversion % | Selectivity % |
|---|---|---|---|
| tetramethylphosphonium-iodide | 0.5 | 16 | 100 |
| | 1 | 43 | 89 |
| | 2 | 79 | 75 |
| | 3 | 83 | 70 |
| sec-dodecyl-sec-hexadecyl-ethyl sulfonium ethyl sulfate | 0.5 | 20 | 100 |
| | 1 | 68 | 96 |
| | 2 | 89 | 77 |
| | 3 | 95 | 64 |
| triethylsulfonium iodide | 0.5 | 14 | 100 |
| | 1 | 55 | 100 |
| | 2 | 81 | 37 |
| | 3 | 87 | 30 |
| trimethyl-sec-dodecyl-ammonium chloride | 0.5 | 60 | 30 |
| | 1 | 81 | 21 |
| | 2 | 100 | 6 |

EXAMPLE VIII

The experiments described in Example VII were repeated but starting from benzyl-beta-methylcrotonate instead of N-methyl-beta-methylcrotonamide. Five catalysts were tested. Table VII presents the results.

TABLE VII

| | Yield of benzyl 2,2-dichloro-3,3-dimethylcyclopropane-carboxylate, after .... hours | | | |
|---|---|---|---|---|
| Catalyst | 0.5 | 1 | 2 | Formation of byproducts |
| tetraethylphosphonium iodide | — | — | 63 | started after 2 hours |
| sec-dodecyl-sec-hexa-decylethylsulfonium ethyl sulfate | — | — | 50 | same |
| tetramethylphosphonium iodide | 44 | 53 | — | started after 1 hour |
| trimethylhydroxyl-ammonium hydroxide | 33 | 50 | — | same |

What is claimed is:

1. A process for preparing esters and amides of gem-dihalocyclopropanecarboxylic acids which comprises contacting an aqueous phase containing an alkali metal hydroxide and an organic phase containing both a haloform and an acid derivative of the formula

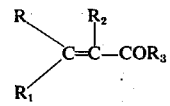

where R is hydrogen, alkyl or phenyl and $R_1$ and $R_2$ each independently is hydrogen or alkyl, $R_3$ is alkyloxy or substituted amino with the proviso that when $R_2$ is hydrogen, $R_3$ is only tert-alkyloxy or mono- or disubstituted amino, in the presence of a catalyst consisting essentially of a tertiary onium compound of the formula

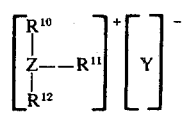

in which Z is sulfur, selenium or tellurium with the proviso that when Z is sulfur then $R^{10}$, $R^{11}$ and $R^{12}$ each is alkyl or cycloalkyl and when Z is selenium or tellurium then $R^{10}$, $R^{11}$ and $R^{12}$ each is alkyl; and Y is hydroxide, iodide, bromide, chloride, fluoride, alkyl sulfate, tetrafluoroborate or tosylate.

2. A process according to claim 1 wherein the acid derivative is an amide and is N-tert-butyl beta-methylcrotonamide.

3. A process according to claim 1 wherein the acid derivative is an ester and is tert-butyl beta-methylcrotonate.

4. A process according to claim 1 wherein the acid derivative is an ester in which $R_2$ represents hydrogen and $R_3$ represents tert-alkyloxy.

5. A process according to claim 1 wherein the acid derivative is an ester in which $R_2$ represents alkyl.

6. A process according to claim 1 wherein the acid derivative is an ester in which $R_2$ represents hydrogen and $R_3$ represents tert-butyloxy.

7. A process according to claim 1 wherein the haloform is chloroform.

8. A process according to claim 1 wherein the catalyst contains more than three carbon atoms.

9. A process according to claim 1 wherein the organic phase contains a chlorinated hydrocarbon as solvent.

10. A process according to claim 1 wherein the catalyst and the haloform are applied in a molar ratio between 1:10 and 1:10,000.

* * * * *